Sept. 22, 1953     E. H. KLUCKHOHN     2,652,639
EARTH DIGGING BUCKET

Filed Dec. 11, 1947     4 Sheets-Sheet 1

*INVENTOR.*
Edward H. Kluckhohn
BY
*Smith, Olsen & Baird*
Attys.

Sept. 22, 1953   E. H. KLUCKHOHN   2,652,639
EARTH DIGGING BUCKET
Filed Dec. 11, 1947   4 Sheets-Sheet 2
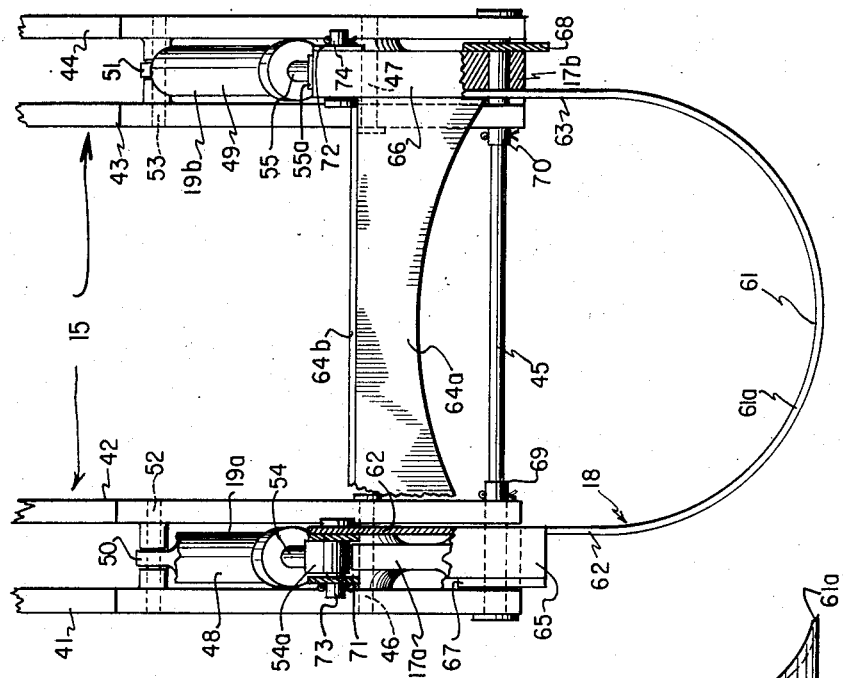
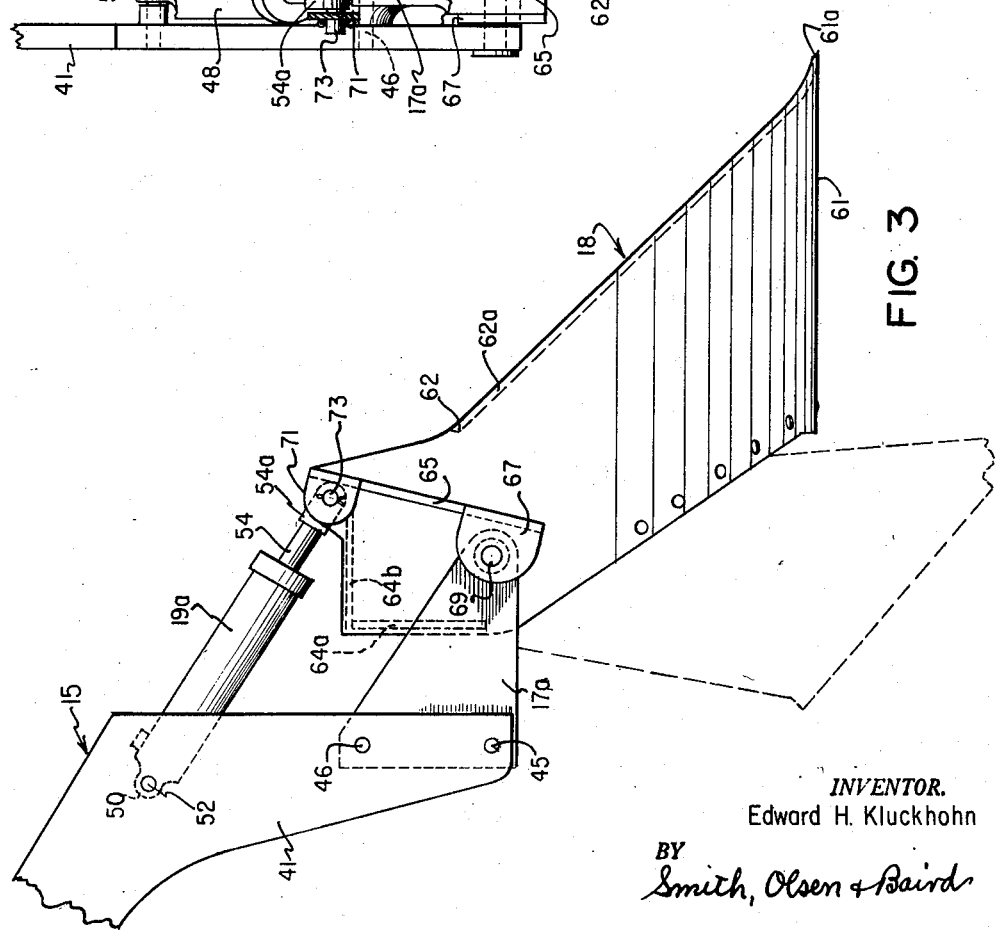
INVENTOR.
Edward H. Kluckhohn
BY
Smith, Olsen & Baird
Attys.

Sept. 22, 1953     E. H. KLUCKHOHN     2,652,639
EARTH DIGGING BUCKET
Filed Dec. 11, 1947     4 Sheets-Sheet 3
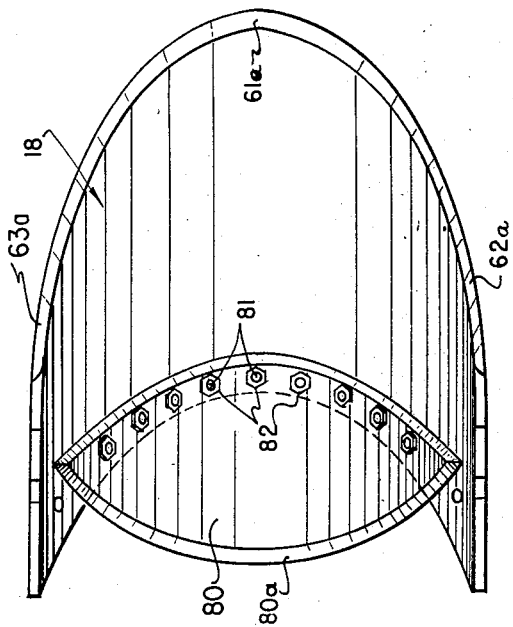
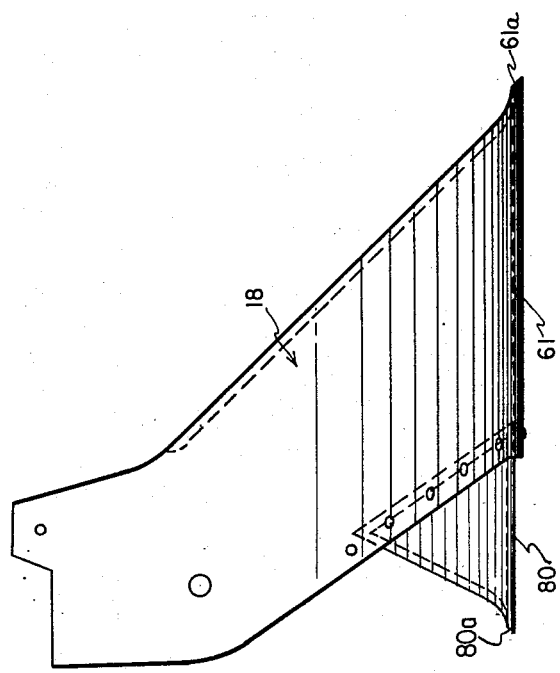
INVENTOR.
Edward H Kluckhohn
BY
Smith, Olsen & Baird
Attys.

Sept. 22, 1953 E. H. KLUCKHOHN 2,652,639
EARTH DIGGING BUCKET

Filed Dec. 11, 1947 4 Sheets-Sheet 4

INVENTOR.
Edward H. Kluckhohn
BY
Smith, Olsen & Baird
Attys

Patented Sept. 22, 1953

2,652,639

UNITED STATES PATENT OFFICE 2,652,639

EARTH DIGGING BUCKET

Edward H. Kluckhohn, Naperville, Ill.

Application December 11, 1947, Serial No. 791,028

4 Claims. (Cl. 37—2)

The present invention relates to earth digging buckets and particularly to such buckets employed in removing and transplanting trees, or the like.

Heretofore, in transplanting a tree, the tree has been removed from the earth by first digging a surrounding trench; the roots of the tree are undercut; and then the tree is lifted by its trunk from the resulting hole in the earth together with any earth adhering to the roots thereof. The roots of the tree are then wrapped in burlap cloth or the like in order to prevent further damage thereto and to retain in place as much of the adhering earth as possible. Next the tree is transported to the site of a previously prepared hole in the earth; the burlap cloth is removed from the roots; the roots are lowered into the hole employing the trunk of the tree; the trunk is then straightened into a substantially vertical position; and ultimately the hole is filled with earth about the roots of the tree.

Not only is this method laborious and expensive, but a considerable number of trees thus transplanted ultimately die. This results not only from the obvious damage to the roots of the tree, but also from the damage to the trunk of the tree, which damages are inherent in the method. Moreover, it is believed that the loss of the original clump of earth enveloping the mass of roots of the tree, which loss is also inherent in the method, is another important factor in the mortality rate experienced incident to transplanting.

Accordingly, it is a general object of the presen invention to provide an improved earth digging bucket that is especially adapted to removing trees from the earth incident to transplanting.

Another object of the invention is to provide an improved earth digging bucket that is especially adapted to replacing trees in previously prepared holes in the earth incident to transplanting.

Another object of the invention is to provide an improved digging bucket for removing a tree from the earth incident to transplanting, whereby there is virtually no damage to the trunk and to the mass of roots thereof, and wherein the original clump of earth enveloping the mass of roots of the tree is not disturbed.

A further object of the invention is to provide an improved earth digging bucket incorporating a detachable earth digging apron.

Further features of the invention pertain to the particular arrangement of the elements of the bucket, whereby the above-outlined and additional operating features thereof are attained.

The invention, both as to its organization and method of operation, together with further objects and advantages thereof, will best be understood by reference to the following specification taken in connection with the accompanying drawings. In the drawings:

Fig. 3 is an enlarged side elevational view of the bucket shown in Fig. 1;

Fig. 4 is an enlarged fragmentary front elevational view of the bucket shown in Fig. 3;

Fig. 5 is an enlarged side elevational view of the lower portion of the bucket, similar to Fig. 3, and a detachable apron carried thereby;

Fig. 6 is a plan view of the lower portion of the bucket and the apron carried thereby, as shown in Fig. 5.

Figure 1:
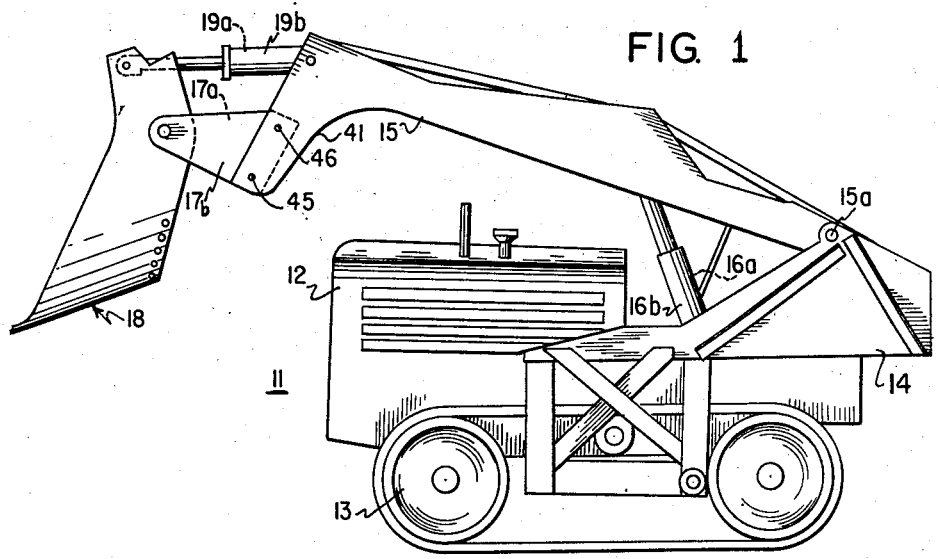
Figure 1 is a side elevational view of an earth working machine of the track-laying type provided with a boom pivotally mounting an earth digging bucket embodying the features of the present invention.

Referring now to Fig. 1, the earth working machine 11 there illustrated is of the conventional Oliver type, comprising an engine 12, track-laying mechanism 13, transmission mechanism, not shown, a supporting frame 14 and a boom 15 pivotally mounted on the supporting frame 14 by an arrangement including a transversally extending pivot bar 15a. Also the machine 11 comprises two hydraulic rams 16a and 16b respectively disposed on the right-hand and on the left-hand sides thereof and arranged between the supporting frame 14 and the boom 15 for the purpose of raising the boom 15 with respect to the supporting frame 14. The front end of the boom 15 carries two supporting plates 17a and 17b respectively disposed on the right-hand and on the left-hand sides thereof upon which an earth digging bucket 18 is pivotally mounted, the bucket 18 embodying the features of the present invention. Further the machine 11 comprises two hydraulic actuators 19a and 19b respectively arranged on the right-hand and on the left-hand sides thereof, and positioned between the boom 15 and the bucket 18, for the purpose of controlling the position of the bucket 18 with respect to the supporting plates 17a and 17b and consequently with respect to the boom 15. Finally, the machine 11 comprises control facility, not shown, as well as a hydraulic control system for operating the rams 16a and 16b and the actuators 19a and 19b.

Figure 2:
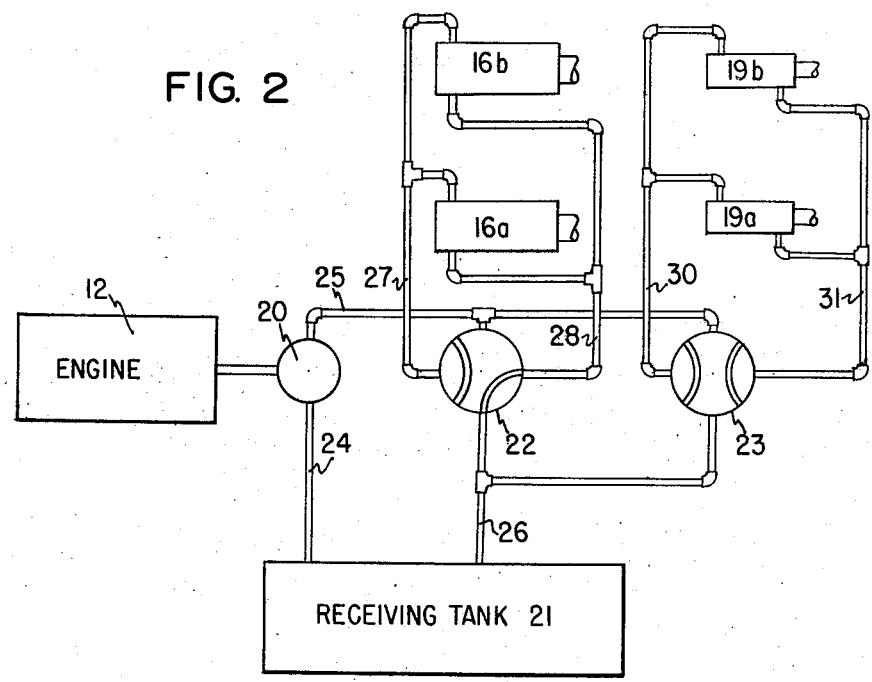
Fig. 2 is a schematic diagram of the hydraulic operating system of the machine shown in Fig. 1.
Figure 7:
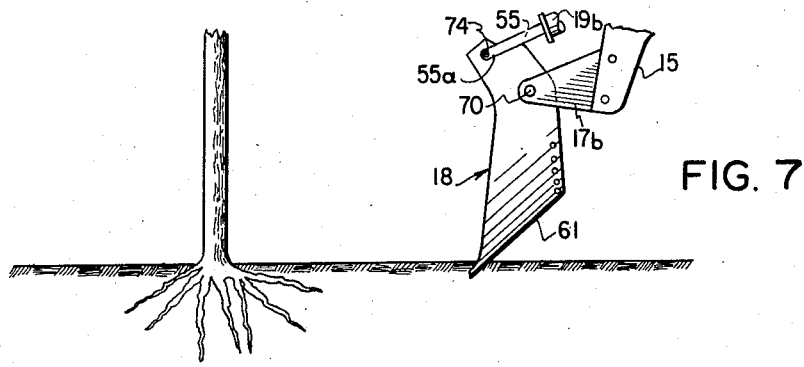
Figs. 7 to 10, inclusive, illustrate the sequential steps in the method of removing a tree from the earth employing a bucket embodying the present invention, as shown in Fig. 1.
Figure 8:
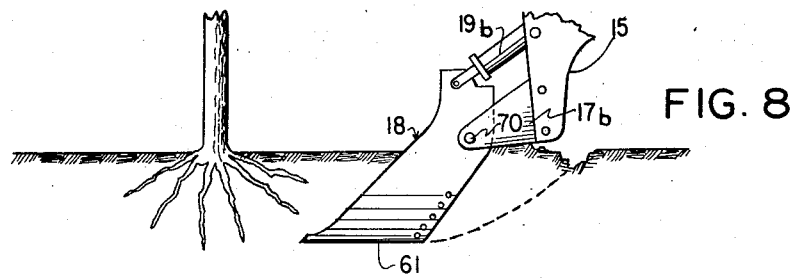

As shown in Fig. 2, the hydraulic control system comprises a liquid pump 20 driven by the engine 12, a liquid receiving tank 21, the two rams 16a and 16b, the two actuators 19a and 19b, a ram control valve 22, an actuator control valve 23 and a pipe or conduit network. The inlet of the pump 20 is connected by an intake pipe 24 to the receiving tank 21, and the outlet of the pump 20 is connected by a pressure pipe 25 to the valves 22 and 23 and the valves 22 and 23 are connected by a return pipe 26 to the receiving tank 21. Finally, the ram control valve 22 is connected to two pipes 27 and 28 to which the rams 16a and 16b are connected in multiple; and the actuator control valve 23 is connected to two pipes 30 and 31 to which the two actuators 19a and 19b are connected in multiple. When the engine 12 is running the pump 22 withdraws liquid from the receiving tank 21 through the intake pipe 24 and pumps it into the pressure pipe 25; whereby either or both of the rams 16a and 16b and the actuators 19a and 19b may be operated by selectively controlling the respective valves 22 and 23.

When the ram control valve 22 is in its release position illustrated, the pressure pipe 25 and the pipe 27 are disconnected; and the pipe 28 and the return pipe 26 are connected; whereby the weight of the boom 15 effects the collapse of the rams 16a and 16b. In order to raise the boom 15, the ram control valve 22 is rotated from its release position illustrated about 45° in the clockwise direction in order to connect the pressure pipe 25 to the pipe 27 and to disconnect the pipe 28 from the return pipe 26. At this time liquid under pressure from the pressure pipe 25 passes through the ram control valve 22 into the pipe 27 and thence into the cylinders of the rams 16a and 16b; whereby the pistons of the rams 16a and 16b are thrust out of the cylinders thereof in order to raise the boom 15 with respect to the pivotally connected supporting frame 14. After the boom 15 has been raised to the required extent, the ram control valve 22 is rotated a few degrees in the counterclockwise direction in order to disconnect the pressure pipe 25 from the pipe 27 without connecting the pipe 28 to the return pipe 26; whereby the trapped liquid in the cylinders of the rams 16a and 16b retain the boom 15 in its raised position. In order to lower the boom 15 to its normal position, the ram control valve 22 is rotated further in the counterclockwise direction back into its release position illustrated in order to connect the pipe 28 to the return pipe 26 without connecting the pressure pipe 25 to the pipe 27; whereby the weight of the boom 15 collapses the rams 16a and 16b forcing the liquid in the cylinders thereof through the pipe 28, the ram control valve 22 and the return pipe 26 back into the receiving tank 21.

When the actuator control valve 23 is in its hold position illustrated, the pressure pipe 25 and the return pipe 26 are disconnected from both of the pipes 30 and 31; whereby the liquid disposed in the opposite ends of the actuators 19a and 19b is trapped, thereby holding the pistons of the actuators 19a and 19b in their set positions. In order to expand the actuators 19a and 19b, the actuator control valve 23 is rotated from its hold position illustrated about 45° in the clockwise direction in order to connect the pressure pipe 25 to the pipe 30 and to connect the return pipe 26 to the pipe 31; whereby liquid under pressure in the pressure pipe 25 passes through the actuator control valve 23 into the pipe 30 and the liquid in the pipe 31 passes through the actuator control valve 23 into the return pipe 26. Accordingly, liquid from the pipe 30 enters the left-hand ends of the cylinders of the actuators 19a and 19b forcing the pistons thereof toward the right; whereby the actuators 19a and 19b are expanded. In order to contract the actuators 19a and 19b, the actuator control valve 23 is rotated from its holding position illustrated about 45° in the counterclockwise direction in order to connect the pressure pipe 25 to the pipe 31 and to connect the return pipe 26 to the pipe 30; whereby liquid under pressure in the pressure pipe 25 passes through the actuator control valve 23 into the pipe 31 and liquid in the pipe 30 passes through the actuator control valve 23 into the return pipe 26. Accordingly, liquid from the pipe 31 enters the right-hand ends of the cylinders of the actuators 19a and 19b forcing the pistons thereof toward the left; whereby the actuators 19a and 19b are contracted. In order to retain the actuators 19a and 19b in a set position, it is only necessary to rotate the actuator control valve 23 back into its hold position illustrated, thereby disconnecting the pressure pipe 25 and the return pipe 26 from both of the pipes 30 and 31; whereby the liquid in the left-hand end of the cylinders of the actuators 19a and 19b is trapped due to the closure of the pipe 30 and liquid in the right-hand end of the cylinders of the actuators 19a and 19b is trapped due to the closure of the pipe 31.

It will be understood that when the actuators 19a and 19b are expanded, the bucket 18 is rotated in the counterclockwise direction about its pivots upon the supporting plates 17a and 17b, as viewed in Fig. 1; and when the actuators 19a and 19b are contracted, the bucket 18 is rotated in the clockwise direction about its pivots upon the supporting plates 17a and 17b, as viewed in Fig. 1. In view of the above, it will be understood that the boom 15 is raised by the hydraulic rams 16a and 16b and is lowered by the action of gravity when the rams 16a and 16b are released. On the other hand, the bucket 18 is rotated about the supporting plates 17a and 17b in either direction by the direct action of the hydraulic actuators 19a and 19b.

Considering now the construction of the boom 15 and the bucket 18 in greater detail and referring to Figs. 3 and 4, it will be observed that the boom 15 comprises two plates 41 and 42 arranged in spaced-apart relation and disposed on the right-hand side of the machine 11 and two plates 43 and 44 arranged in spaced-apart relation and disposed on the left-hand side of the machine 11. It will be understood that the plates 41, 42, 43 and 44 are suitably secured together to form a rigid structure, the rear end of which is pivotally mounted to the frame 14 by the pivot bar 15a, as indicated in Fig. 1. Moreover, the ram 16a is arranged to operate between the right-hand side of the frame 14 and the two plates 41 and 42; while the ram 16b is arranged to operate between the left-hand side of the frame 14 and the two plates 43 and 44. The extreme front ends of the plates 41, 42, 43 and 44 are tied together by a bar 45 extending through aligned openings formed therein; which bar 45 is also instrumental in retaining in place the supporting plates 17a and 17b. More particularly, the supporting plates 17a and 17b are substantially triangular in form and project forwardly from the front end of the boom 15 and are respectively secured between the pairs of plates 41, 42 and 43, 44. Also the plate 17a is further anchored in place by a pin 46 extending through aligned openings formed therein and in the front ends of the plates 41 and 42; and likewise, the plate 17b is further anchored in place by a pin 47 extending through aligned openings formed therein and in the front ends of the plates 43 and 44.

The actuators 19a and 19b respectively provided with casings 48 and 49 that respectively terminate in fixtures 50 and 51; which, in turn, are respectively secured between the pairs of plates 41, 42 and 43, 44. More particularly, the fixture 50 is pivotally connected to a pin 52 extending between the plates 41 and 42; while the fixture 51 is pivotally connected to a pin 53 extending between the plates 43 and 44. The pistons of the actuators 19a and 19b are respectively connected to piston rods 54 and 55 that extend through the respective casings 48 and 49 and terminate in respective fixtures 54a and 55a.

The bucket 18 comprises a substantially semi-cylindrical bottom wall 61 and two substantially flat parallel spaced-apart walls 62 and 63 formed integrally therewith to define open front and rear faces. The side walls 62 and 63 extend upwardly and rearwardly from the bottom wall 61, the leading and trailing edges of the side walls 62 and 63 converging upwardly; whereby the depth of the bottom wall 61 is greater than that of the side walls 62 and 63. Also the leading edges of the bottom wall 61 and the side walls 62 and 63 are provided with earth-cutting knives respectively indicated at 61a, 62a and 63a. In order to lend rigidity to the construction of the bucket 18, a substantially vertically disposed plate 64a and a substantially horizontally disposed plate 64b are arranged between the side walls 62 and 63 respectively adjacent to the rear and top edges thereof. This substantially L-shaped structure formed by the plates 64a and 64b is secured in place between the side walls 62 and 63 by welding or the like. Finally, two fixtures 65 and 66 are respectively secured to the outer surfaces of the side walls 62 and 63 adjacent to the upper ends thereof by welding or the like.

The fixture 65 carries a lower plate 67 spaced outwardly from the adjacent side wall 62 and receiving the extreme outer end of the adjacent supporting plate 17a; and likewise, the fixture 66 carries a lower plate 68 spaced outwardly from the adjacent side wall 63 and receiving the extreme outer end of the adjacent supporting plate 17b. The side wall 62 of the bucket 18 is pivotally mounted upon the supporting plate 17a by an arrangement comprising a pin 69 extending through aligned openings formed in the lower plate 67, the extreme outer end of the supporting plate 17a and the adjacent side wall 62; and likewise, the side wall 63 of the bucket 18 is pivotally mounted upon the supporting plate 17b by an arrangement comprising a pin 70 extending through aligned openings formed in the lower plate 68, the extreme outer end of the supporting plate 17b and the adjacent side wall 63. Also the fixture 65 carries an upper plate 71 spaced outwardly from the adjacent side wall 62 and receiving the fixture 54a carried on the extreme outer end of the adjacent piston rod 54 of the actuator 19a; and likewise, the fixture 66 carries an upper plate 72 spaced outwardly from the adjacent side wall 63 and receiving the fixture 55a carried on the extreme outer end of the adjacent piston rod 55 of the actuator 19b. The side wall 62 of the bucket 18 is pivotally connected to the fixture 54a by an arrangement including a pin 73 extending through aligned openings formed in the upper plate 71, the fixture 54a and the adjacent side wall 62; and likewise, the side wall 63 of the bucket 18 is pivotally connected to the fixture 55a by an arrangement including a pin 74 extending through aligned openings formed in the upper plate 72, the fixture 55a and the adjacent side wall 63.

Accordingly, the fixtures 65 and 66 respectively carried by the side walls 62 and 63 of the bucket 18 provide lower pivot attachments, including the lower plates 67 and 68, so that the bucket 18 may be pivotally mounted upon the supporting plates 17a and 17b respectively. Moreover, the fixtures 65 and 66 provide upper actuator attachments, including the upper plates 71 and 72, so that the bucket 18 may be readily secured to the actuators 19a and 19b respectively for controlled tilting about the pivot attachments.

As shown in Figs. 5 and 6, the bucket 18 may be provided with a detachable apron 80 that may be removably secured to the bottom wall 61 adjacent to the trailing edge thereof by a series of bolts 81 and cooperating nuts 82. The apron 80 is substantially semi-cylindrical and may be readily detachably secured in place within the bottom wall 61 in the manner noted. Preferably, the nuts 82 are arranged adjacent to the leading edge of the apron 80 that, in turn, is disposed over the trailing edge of the bottom wall 61 in order that the heads of the bolts 81 do not materially interfere with earth digging when the apron 80 is utilized with the bucket 18. The trailing edge of the apron 80 is provided with an earth-cutting knife indicated at 80a so that earth digging may be effected in either direction by the bucket 18 when the apron 80 is attached thereto. Preferably, a plurality of the aprons 80 of different shapes and sizes are provided so that the one best suited to the earth digging operation contemplated may be selected and detachably secured to the bucket 18.

Figure 9:
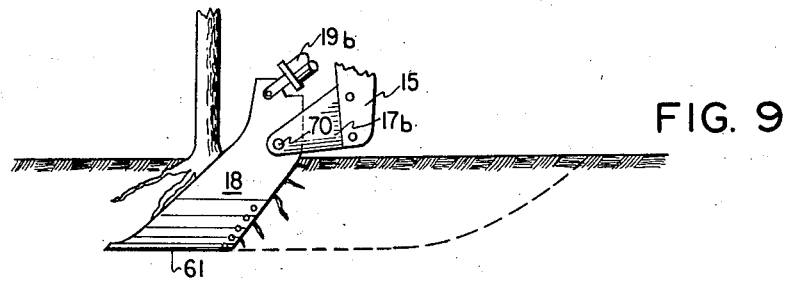
Figure 10:
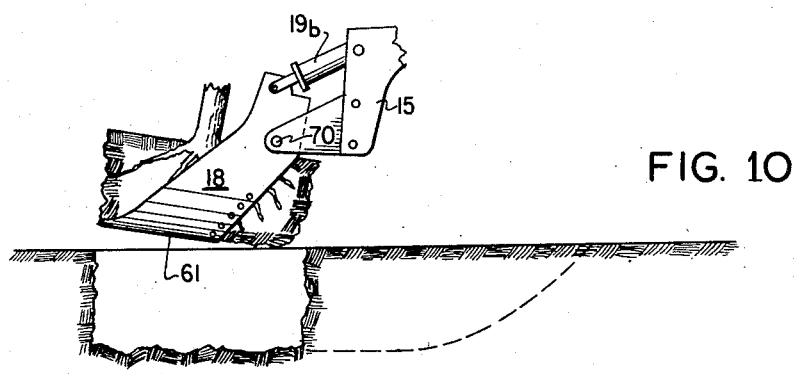

Considering now the method of transplanting trees and referring to Figs. 7 to 10, inclusive, it is pointed out that the machine 11 is utilized in conjunction with the bucket 18 and that the apron 80 may be attached to the bucket 18 if desired, although this is not necessary. In carrying out the method, a hole is first prepared in the earth, utilizing the machine 11 and the bucket 18, in which the tree is to be placed. The machine 11 is then employed in removing the tree from its present location. More particularly, the machine 11 is moved to the present location of the tree and aligned with respect to the centerline of the trunk of the tree in the immediate vicinity thereof. Next the actuators 19a and 19b are expanded in order to tilt the bucket 18 so that the bottom wall 61 thereof is inclined with respect to the earth. At this time the boom 15 is lowered in order to force the leading edge of the bucket 18 into the earth in an inclined position in the vicinity of the tree. After the leading edge of the bottom wall 61 of the bucket 18 has been forced into the earth to a depth somewhat greater than that of the mass of roots of the tree and the side walls 62 and 63 of the bucket 18 are aligned with respect to the opposite sides of the trunk of the tree, the actuators 19a and 19b are contracted in order to tilt the bucket 18 so that the bottom wall 61 thereof is moved into a substantially horizontal position and positioned at a depth greater than that of the mass of roots of the tree. These steps will be readily understood from an examination of Figs. 7 and 8. Next the boom 15 is advanced toward the tree so that the earth entering the open front face of the bucket 18 passes over the bottom wall 61 and out of the open rear face of the bucket 18; which advancement of the boom 15 is continued until the leading edge of the bottom wall 61 has moved past the mass of roots of the tree and the center of gravity of the tree is disposed above the bottom wall 61; all as clearly indicated in Fig. 9. At this time, the boom 15 is raised in order to remove the tree, together with the undisturbed clump of earth enveloping the mass of roots of the tree, as indicated in Fig. 10. Subsequently, as the boom 15 is further raised the actuators 19a and 19b are expanded slightly in order to tilt the bucket 18 as it is raised so as to maintain the trunk of the tree in a substantially vertical position. Next the machine 11, the bucket 18 and its contents are moved from the vicinity of the old location of the tree to the previously prepared hole in the earth where the tree is to be relocated. At this time the machine 11 is operated to center the bucket 18 and its contents with respect to the previously prepared hole; whereupon the boom 15 is lowered and the actuators 19a and 19b are contracted slightly in order to pivot the bucket 18 to maintain the trunk of the tree in a substantially vertical position. The mass of roots of the tree are thus lowered into the prepared hole until the bottom wall 61 of the bucket 18 rests upon the bottom of the prepared hole. At this time, the machine 11 is moved away from the prepared hole, the boom 15 is raised and the actuators 19a and 19b are expanded to tilt the bucket 18; whereby the bucket 18 is removed from the prepared hole leaving the mass of the roots of the tree therein. At this time the trunk of the tree is straightened with respect to the vertical position and earth is filled into the hole about the clump of earth enveloping the mass of roots of the tree.

This method of transplanting a tree is very advantageous in view of the fact that neither the trunk nor the mass of roots of the tree are in any way damaged incident to the removal of the tree from its old location. Moreover, the original clump of earth enveloping the mass of roots of the tree is preserved and transported along with the tree by the machine 11 into the new location; whereby the original clump of earth enveloping the mass of roots of the tree is undisturbed incident to transplanting the tree from its old location to its new location; which factor is considered to be very important in reducing the mortality rate of trees incident to transplanting utilizing the present method. Moreover, the method minimizes handling of the tree as it will be understood that the tree is ordinarily transported from its old location to its new location utilizing the bucket 18, without transferring the tree to another vehicle.

The above described method of transplanting a tree is disclosed and claimed in the copending divisional application of Edward H. Kluckhohn, Serial No. 330,285, filed January 8, 1953.

It is advantageous to utilize the apron 80 in conjunction with the bucket 18 when the tree being transplanted is fairly large since the apron 18 not only extends the bottom wall 61 of the bucket 18 preventing disturbance of the original clump of earth enveloping the mass of roots of the tree, but it also provides the bucket 18 with earth cutting facility in either direction which may occasionally be required. In other words, after the leading edge of the bucket has been moved past the mass of roots of the tree as illustrated in Fig. 9, it may be desirable to move the bucket 18 back and forth toward and away from the tree, when the apron 80 is attached, permitting earth cutting in either direction and the consequent severing of the ends of the roots of the tree projecting beyond the principal mass thereof. The semi-cylindrical shape of the bottom wall 61 of the bucket 18, as well as that of the apron 80, is very advantageous in the removal of trees since the principal mass of roots of a tree have a general semi-spherical configuration.

In view of the foregoing, it is apparent that there has been provided an earth digging bucket of improved construction and arrangement.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An earth digging bucket comprising a forwardly projecting bottom wall and connecting upwardly and rearwardly extending side walls defining open front and rear faces, the leading edges of said bottom and side walls being provided with earth-cutting knives, a rearwardly projecting apron carried by the trailing edge of said bottom wall, the trailing edge of said apron being provided with an earth-cutting knife, pivot attachments secured to said side walls, whereby said bucket may be pivotally mounted upon a support, and actuator attachments secured to said side walls, whereby said bucket may be readily tilted about said pivot attachments with respect to the support.

2. An earth digging bucket comprising a forwardly projecting bottom wall and connecting upwardly and rearwardly extending side walls defining open front and rear faces, the leading edges of said bottom and side walls being provided with earth-cutting knives, a rearwardly projecting apron detachably secured to said bottom wall adjacent to the trailing edge thereof, the trailing edge of said apron being provided with an earth-cutting knife, pivot attachments secured to said side walls, whereby said bucket may be pivotally mounted upon a support, and actuator attachments secured to said side walls, whereby said bucket may be readily tilted about said pivot attachments with respect to the support.

3. An earth digging bucket comprising a forwardly projecting substantially semi-cylindrical bottom wall and connecting upwardly and rearwardly extending substantially flat side walls defining open front and rear faces, the leading edges of said bottom and side walls being provided with earth-cutting knives, a rearwardly projecting substantially semi-cylindrical apron carried by said bottom wall, the trailing edge of said apron being provided with an earth-cutting knife, pivot attachments secured to said side walls, whereby said bucket may be pivotally mounted upon a support, and actuator attachments secured to said side walls, whereby said bucket may be readily tilted about said pivot attachments with respect to the support.

4. An earth digging bucket comprising a forwardly projecting substantially semi-cylindrical bottom wall and connecting upwardly and rearwardly extending substantially flat side walls defining open front and rear faces, the leading edges of said bottom and side walls being provided with earth-cutting knives, a rearwardly projecting substantially semi-cylindrical apron detachably secured to the upper surface of said bottom wall adjacent to the trailing edge thereof, the trailing edge of said apron being provided with an earth-cutting knife, pivot attachments secured to said side walls, whereby said bucket may be pivotally mounted upon a support, and actuator attachments secured to said side walls, whereby said bucket may be readily tilted about said pivot attachments with respect to the support.

EDWARD H. KLUCKHOHN.

References Cited in the file of this patent

UNITED STATES PATENTS

| Number | Name | Date |
|---|---|---|
| 1,190,055 | Wick | July 4, 1916 |
| 1,636,625 | Conrad | July 19, 1927 |
| 1,894,516 | Karstedt | Jan. 17, 1933 |
| 1,909,752 | Calkins | May 16, 1933 |
| 1,919,075 | Rasmussen | July 18, 1933 |
| 1,938,952 | Cole et al. | Dec. 12, 1933 |
| 2,063,698 | Roe | Dec. 8, 1936 |
| 2,083,571 | Levandowsky | June 15, 1937 |
| 2,295,458 | Edwards | Sept. 8, 1942 |
| 2,303,379 | Mork | Dec. 1, 1942 |
| 2,323,434 | Williams | July 6, 1943 |
| 2,506,662 | Cusenbary | May 9, 1950 |
| 2,592,052 | McKenna | Apr. 18, 1952 |